United States Patent [19]

Matteucci

[11] Patent Number: 5,895,849
[45] Date of Patent: Apr. 20, 1999

[54] BALANCING METHOD FOR MOTOR VEHICLE WHEELS

[75] Inventor: Marco Matteucci, Rio Saliceto, Italy

[73] Assignee: G.S. S.r.l., Correggio, Italy

[21] Appl. No.: 08/845,167

[22] Filed: Apr. 21, 1997

[30] Foreign Application Priority Data

Jul. 19, 1996 [IT] Italy ............................... MO96A0101

[51] Int. Cl.$^6$ ............................................. G01M 1/16
[52] U.S. Cl. ................................................... 73/462
[58] Field of Search .......................... 73/462, 460, 459, 73/487, 473, 475, 476, 65.01, 65.02, 65.07; 364/566, 508

[56] References Cited

U.S. PATENT DOCUMENTS

| | | | |
|---|---|---|---|
| 4,435,982 | 3/1984 | Borner | 73/462 |
| 4,489,607 | 12/1984 | Park | 73/462 |
| 4,741,210 | 5/1988 | Maus | 73/462 |
| 5,447,064 | 9/1995 | Drechsler et al. | 73/462 |

FOREIGN PATENT DOCUMENTS

| | | |
|---|---|---|
| 3342542 | 11/1983 | Germany. |
| 3501557 | 1/1985 | Germany. |
| 4028336 | 9/1990 | Germany. |
| 4028656 | 9/1990 | Germany. |

*Primary Examiner*—Hezron Williams
*Assistant Examiner*—Richard A. Moller
*Attorney, Agent, or Firm*—Browdy and Neimark

[57] ABSTRACT

The invention relates to a method for balancing motor vehicle wheels, comprising the phases of: mounting a wheel on a rotatable shaft, setting the shaft and wheel in rotation, reading off any forces due to an imbalance in a wheel by means of force transducers, processing signals coming from the transducers by means of a processor, in order to provide an indication of an entity and geometrical arrangement of masses to be applied to the wheel in order to correct any detected imbalance. With the method, a balancing speed is determined in accordance with at least one parameter indicating an inertia to rotation of the wheel, according to a correspondence in which a balancing speed is lower for a wheel having higher inertia.

20 Claims, No Drawings

BALANCING METHOD FOR MOTOR VEHICLE WHEELS

BACKGROUND OF THE INVENTION

The invention relate, to a method for balancing motor vehicle wheels.

Prior art balancing systems on balancing machines are characterized in that they reach a predetermined velocity to which the wheel has to be brought so that the balancing operation can be carried out.

This operation, as s well known, comprises recording the forces due to imbalance by means of force transducers, applied on the shaft the wheel is mounted on, and the processing of transducer signals with the aim of obtaining an indication of the entity and geometric arrangement of masses to be applied to the wheel to correct such an imbalance. Once the above-mentioned rotation speed has been reached, some known machines stay at that same velocity throughout the time necessary for balancing. This means that the motor driving the shaft on which the wheel is mounted has to be kept in motion.

Other balancers use the motor only during the start-up phase, to accelerate the wheel to the balancing speed, after which the motor is turned off and all the balancing operations are carried out with the system operating by pure inertia, which means in effect that the wheel speed is gradually diminishing.

These prior art machines have limits and drawbacks when on a same machine it is necessary to carry out balancing operations on wheels which are of very different types.

To bring the machine up to the predetermined working speed when a larger wheel is mounted, a longer time is needed than in the case of smaller or lighter wheels.

A further negative characteristic of known balancing machines is having to size the motor according to the largest wheels which will have to be mounted, i.e. those with highest inertia, so that even for these wheels an acceleration can be reached which will be sufficient for the balancing operation within an acceptable operation time.

A further limit of the known machines can be traced to the fact that normally the number of wheel rotations taken into consideration and achieved in the interest of reading off the forces due to imbalance is determined once for all wheels, independently of the inertia characteristics of the wheel to be balanced. For this reason, due to the considerable differences that might emerge during the generation of the imbalance signals (differences originating from wheels of very different types) it might become necessary to adopt signal interpretation devices on the balancing machines, which devices interpret the signals and act upon them (for example, by amplifying small signals produced by very small wheels).

SUMMARY OF THE INVENTION

The present invention, as it is characterized in the accompanying claims, obviates the drawbacks and limits in the prior art by providing a balancing method of motor vehicle wheels in which the balancing speed is determined according to at least one parameter indicating the inertia of the wheel rotation according to a parameter by which when the wheel inertia is greater than the balancing speed correspondingly diminishes, and vice versa.

One advantage of the, present invention is that it enables relatively small motors to be used for rotating the wheel.

A further advantage of the invention consists in the considerable reduction of total balancing time necessary.

Further characteristics and advantages of the present invention will better emerge from the detailed description that follows of a preferred but non-exclusive embodiment of the invention, illustrated in the following de purely by way of non-limiting example.

DESCRIPTION OF THE PREFERRED EMBODIMENTS

The balancing method for motor vehicle wheels, according to the invention, is of the type which comprises the phases of mounting a wheel on a rotating shaft by means of special fixing flanges, setting the shaft (with the wheel mounted) in rotation, calculating the forces due to any imbalance on the wheel by means of force transducer, and processing the signals from said transducers by means of a computer with the aim of providing a precise indication of the entity and geometrical arrangement of weights on the wheel which will correct said imbalance. The indicating signals of the forces of imbalance are acquired starting from a starting rotation velocity which is neither accidental nor determined once only for all wheels, but which is variable inasmuch as it is determined time by time according to at least one indicative parameter of the rotation inertia of the wheel calculated from a parameter in which when the wheel inertia rises the wheel speed correspondingly diminishes.

The parameter which can be used as indicative of the greater or smaller inertia of the wheel can be constituted by the moment of inertia of the wheel with respect to the rotation axis, if the moment is known, or it can be constituted by other parameters which, more or less approximately, can be taken as indicative of the moment of inertia of the wheel.

In particular, indicative parameters of the wheel inertia (preferably combined parameters) might be some of the geometrical characteristics of the wheel itself, such as the diameter of the rim or the wheel, the breadth of the rim or the wheel, and the offset of the rim. Still another parameter might be the inertia of the wheel, as well as its weight. A still further parameter might be the acceleration value of the wheel set in rotation during the start-up phase, with a predetermined balancing machine motor power. In this case it will be sufficient to mount means on the machine for calculating the value of acceleration during the start-up phase.

Once processed following indications which have been established during specific experimentation, the existing correspondences between the inertia characteristics of the various wheels which can be balanced and the relative parameters can easily be inputted into a computer, in particular a digital processor, whose function is to calculate the operative speed automatically, starting from which operative speed the balancing can be performed according to the inertia characteristics of the wheel.

To illustrate, let us imagine a case where as an indicative parameter of wheel inertia a couple of geometrical characteristics of the wheel itself were taken, let us say the diameter and breadth; these characteristics would have to be inputted into the computer, which would then automatically determine the speed at which the wheel mounted on the balancer would have to be launched.

If, as another example, the indicative parameter of the inertia of the wheel were taken to be the acceleration of the wheel during the launching phase, this very acceleration would be communicated to the processor, which, on the basis of a pre-established correspondence between acceleration values and wheel inertia characteristics, would calculate the operative speed starting from which the balancing could be carried out, and cut out the motor once that speed were reached.

In measuring the operative speed from which the balancing—whether carried out at constant speed or at diminishing wheel speed (i.e. with the motor cut off)—against the inertia characteristics of the wheel, the actual motor power necessary is not high and a smaller motor can be fitted than is normal for balancing machines where traditionally the size of the motor depends on the size of the largest wheels that will be balanced—wheels having high inertia characteristics—which will all the same have to brought up to a determined velocity.

This advantage, that of rotating high-inertia wheels at a relatively low speed, and in any case a speed which is lower than the speed at which lower-inertia wheels are rotated, inflicts no disadvantages from the point of view of the generation of signals; showing imbalances collected by the transducers, since normally the wheels characterized by a higher inertia are also the largest wheels where the imbalances give rise to very wide breadth signals even at lower rotation speeds.

If, as is common, the balancing machine is equipped with a motor having a predetermined power, the present method can be carried out by programming the same length of motor launch phase independently of the type of wheel to be balanced. That is, the motor launch phase is of constant length regardless of the wheel parameters.

In this case, a high-inertia wheel will obviously be launched at an operative speed (i.e. the speed at which the balancing process will begin) which is considerably lower than the speed a low-inertia wheel will achieve. Still following the example of a balancer fitted with a motor of predetermined power, the operative speed at which the wheel will be launched can be decided indirectly by time-calculating the launch phase, during which the motor is powered up, according to one of said inertia-indicating parameters; the calculation would be based on the correspondence that with wheels having higher inertia the launch time would be shorter, and vice versa. These indicative parameters can be constituted by the moment of inertia of the wheel with respect to the rotation axis, by at least two of the characteristic dimensions of the wheel (diameter, breadth, offset) which define its geometry or from the weight of the wheel, or even by the read-off value of acceleration of the wheel drawn into rotation during the launch phase itself. In any case the launch time can be considerably shortened in relation to traditional applications.

The time needed for performing the balancing operation can also be shortened, depending on the number of wheel rotations considered or read off in order to obtain the signals produced by the forces due to imbalance. The time needed can be optimized if calculated according to at least one of said inertia-indicating parameters, in the sense that the higher wheel inertia there is, the smaller the number of revolutions considered or read off.

In this case too, the parameters can be constituted by the moment of inertia of the wheel with respect to the rotation axis, by at least one of the geometrical characteristics of the wheel (diameter, breadth, offset), by the weight of the wheel or the acceleration value of the wheel drawn into rotation with a predetermined motor power during the launch phase.

What actually happens is that the number of samples, that is, rotations read off for measuring, is lower for larger wheels and greater for smaller wheels.

The choice of the parameter or parameters of the wheel inertia characteristics will essentially depend on the characteristics of the balancer machine destined to operate according to the method described and the envisaged use modalities.

What is claimed:

1. A method for balancing wheels of motor vehicles, comprising the following steps:

mounting a wheel on a rotatable shaft;

setting said shaft and wheel in rotation;

reading off any forces due to an imbalance in said wheel by means of force transducers; and processing signals coming from said transducers by means of a processor providing an indication of a geometrical arrangement of masses to be applied to said wheel in order to correct any detected imbalance;

wherein an operative speed of said shaft and wheel, starting from which operative speed a balancing operation is performed, is determined according to at least one parameter related to a moment of inertia of said wheel according to a functional relationship in which said operative speed is lower for wheels having higher inertia, and in which said operative speed is higher for wheels having lower inertia.

2. The method of claim 1, wherein said moment of inertia is with respect to an axis of rotation thereof.

3. The method of claim 2, wherein the parameter includes a wheel diameter and the moment of inertia is substantially proportional to at least one of a square of the wheel diameter and a breadth of the wheel.

4. The method of claim 2, wherein the parameter includes a wheel weight and the moment of inertia is substantially proportional to the weight of the wheel.

5. The method of claim 1, wherein said parameter includes at least two characteristic wheel dimensions selected from the group consisting of diameter, breadth and offset.

6. The method of claim 1, wherein said parameter includes a weight of the wheel.

7. The method of claim 1, wherein said parameter includes an acceleration value of the wheel driven to rotation by a predetermined voltage to a motor.

8. The method of claim 1, wherein said operative speed is calculated automatically by a processor.

9. The method of claim 1, wherein a number of rotations of a wheel considered in a reading-off for calculation of forces due to an imbalance is calculated according to the parameter related to the moment of inertia of said wheel, such that a number of rotations read off is smaller if the inertia of a wheel is higher, and the number of rotations is greater if the inertia of wheel is lower.

10. The method of claim 9, wherein said moment of inertia is with respect to an axis of rotation thereof.

11. The method of claim 9, wherein said parameter includes at least one characteristic wheel dimension selected from the group consisting of diameter, breadth and offset.

12. The method of claim 9, wherein said parameter includes a weight of the wheel.

13. The method of claim 9, wherein said parameter includes an acceleration value of the wheel driven to rotation by a predetermined voltage to a motor during a launch phase of said wheel rotation.

14. The method of claim 1, comprising powering said rotatable shaft on which said wheel is mounted by a motor, powered by a fixed voltage, during a launching phase in which a rotation speed of said wheel is brought up to the operative speed; wherein the launching phase has a predetermined fixed duration for all wheels to be balanced.

15. The method of claim 1, comprising powering said rotatable shaft bearing the wheel to be balanced by a motor, powered by a fixed voltage, during a launching phase in which a rotation speed of said wheel is brought up to an operative speed; wherein the launching phase is of a duration calculated according to a correspondence in which a duration of the launching phase of the wheel decreases as the moment of inertia of the wheel increases.

16. The method of claim 15, wherein said moment of inertia is with respect to an axis of rotation thereof.

17. The method of claim 15, wherein said parameter includes at least one characteristic wheel dimension selected from the group consisting of diameter and offset.

18. The method of claim 15, wherein said parameter includes a weight of the wheel.

19. The method of claim 15, wherein said parameter includes an acceleration value of the wheel rotated by said motor during a launch phase of said wheel.

20. The method of claim 1, wherein the step of setting said shaft and wheel in rotation comprises a motor launch phase, and wherein the motor launch phase is of constant length regardless of a value of the parameter.

* * * * *